(12) United States Patent
Yu et al.

(10) Patent No.: US 11,686,356 B2
(45) Date of Patent: Jun. 27, 2023

(54) ELECTROMAGNETIC DOG CLUTCH

(71) Applicant: Jing-Jin Electric Technologies Co., Ltd., Beijing (CN)

(72) Inventors: Ping Yu, Beijing (CN); Haitao Jin, Beijing (CN); Zhengqiang Pei, Beijing (CN); Yuxia Hei, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 149 days.

(21) Appl. No.: 17/439,213

(22) PCT Filed: Mar. 16, 2020

(86) PCT No.: PCT/CN2020/079481
§ 371 (c)(1),
(2) Date: Sep. 14, 2021

(87) PCT Pub. No.: WO2020/187180
PCT Pub. Date: Sep. 24, 2020

(65) Prior Publication Data
US 2022/0163071 A1    May 26, 2022

(30) Foreign Application Priority Data
Mar. 15, 2019 (CN) .......................... 201920332243.3

(51) Int. Cl.
*F16D 27/118* (2006.01)
*F16D 27/108* (2006.01)
*F16D 27/14* (2006.01)

(52) U.S. Cl.
CPC .......... *F16D 27/118* (2013.01); *F16D 27/108* (2013.01); *F16D 27/14* (2013.01)

(58) Field of Classification Search
CPC ....... F16D 27/118; F16D 27/108; F16D 27/14
See application file for complete search history.

(56) References Cited

U.S. PATENT DOCUMENTS

| 3,624,768 A | 11/1971 | Nussli | |
|---|---|---|---|
| 9,458,892 B2 * | 10/2016 | Fujii | ..................... F16D 27/118 |
| 11,168,748 B2 * | 11/2021 | Pei | ........................ F16D 27/14 |

FOREIGN PATENT DOCUMENTS

| CN | 204921772 U | 12/2015 |
|---|---|---|
| CN | 108443353 A | 8/2018 |

(Continued)

OTHER PUBLICATIONS

European Search Report dated Jul. 12, 2021 in EP 20773601.8.
International Search Report issued in PCT/CN2020/079481 dated Jun. 12, 2020.

*Primary Examiner* — Richard M Lorence
(74) *Attorney, Agent, or Firm* — Fox Rothschild LLP; Carol E. Thorstad-Forsyth

(57) ABSTRACT

An electromagnetic dog clutch is disclosed to solve the technical problem in conventional electromagnetic dog clutches that the friction is easy to occur between a bearing seat and an end cap of a movable gear sleeve. The electromagnetic dog clutch comprises a movable gear sleeve (5) and a fixed gear sleeve (12) that mesh with each other for transmission. A first end cap (6) is provided on an outer side of the movable gear sleeve (5), a bearing (1) is provided on an outer circumference of the movable gear sleeve (5), the bearing (1) is embedded in a bearing seat (7), a rear end of the bearing seat (7) is provided with a positioning surface, and a front end of the first end cap (6) is a vertical plane that matches the positioning surface of the bearing seat (7). The front end of the first end cap (6) is provided with a positioning pin (15), the rear end of the bearing seat (7) is provided with a positioning hole to cooperate with the positioning pin (15), and the positioning pin (15) is inserted into the positioning hole to limit the bearing seat (7) and the first end cap (6) so that they can move in an axial direction (Continued)

relative to each other but cannot rotate relative to each other, thereby preventing the occurrence of friction between them.

10 Claims, 3 Drawing Sheets

(56) References Cited

FOREIGN PATENT DOCUMENTS

| | | |
|---|---|---|
| CN | 208203846 U | 12/2018 |
| CN | 208236944 U | 12/2018 |
| CN | 210034218 U | 2/2020 |
| EP | 0475504 A2 | 3/1992 |
| EP | 1903259 A2 | 3/2008 |

* cited by examiner

ELECTROMAGNETIC DOG CLUTCH

CROSS-REFERENCE TO RELATED APPLICATIONS

The present application is a U.S. National Phase of International Patent Application No. PCT/CN2020/079481 which was filed on Mar. 16, 2020 and claims priority to Chinese Patent Application No. 201920332243.3 which was filed on Mar. 15, 2019. The contents of the listed patent documents are incorporated herein by reference in their entireties.

TECHNICAL FIELD

The present utility model relates to the technical field of clutches, and in particular to an electromagnetic dog clutch.

BACKGROUND

Electromagnetic dog clutches are widely used in automobiles. A conventional electromagnetic dog clutch, as shown in FIG. 1, comprises a movable gear sleeve 5 and a fixed gear sleeve 12 that mesh with each other. A fixed armature 10 is sleeved on the outer side of the sleeve 12, a gap is provided between the fixed armature 10 and the fixed gear sleeve 12, and their positions are fixed. An electromagnetic coil 11 is provided inside the fixed armature 10. A movable armature 8 is rotatably sleeved on the outer side of the movable gear sleeve 5. The movable armature 8 can move with the movable gear sleeve 5 along the axial direction. After the electromagnetic coil 11 is energized, the movable armature 8 is attracted to the fixed armature 10, so that the movable gear sleeve 5 and the fixed gear sleeve 12 mesh with each other.

A bearing 1 is sleeved on the outer circumference of the movable gear sleeve 5, the bearing 1 is embedded in the bearing seat 7, the movable armature 8 is connected with the front end of the bearing seat 7, and the rear end of the bearing seat 7 is provided with a positioning surface. The positioning surface of the bearing seat 7 is positioned in contact with the first end cap 6, and the front end of the first end cap 6 is a vertical plane that matches the positioning surface of the bearing seat 7.

Under the support of the bearing 1, when the movable armature 8 is attracted to the fixed armature 10, the bearing seat 7 will not rotate with the movable gear sleeve 5. When the movable armature 8 is separated from the fixed armature 10, the movable gear sleeve 5 will be disengaged from the fixed gear sleeve 12, but the movable gear sleeve 5 will continue to rotate and cannot stop immediately. Although the torque transmitted by the movable gear sleeve 5 to the bearing seat 7 is very small, at this moment the bearing seat 7 will also follow the movable gear sleeve 5 to rotate, and thus there will be friction between the bearing seat 7 and the first end cap 6, which is likely to cause damage to the first end cap 6.

SUMMARY

In view of the above problems, the object of the present utility model is to provide an electromagnetic dog clutch, in which the bearing seat and the end cap of the movable gear sleeve are limited by a positioning pin and positioning hole, the bearing seat and the end cap of the movable gear sleeve can move in an axial direction relative to each other but cannot rotate relative to each other, thereby preventing the occurrence of friction between them.

In order to achieve the above object, the present utility model adopts the following technical solutions.

The present utility model provides an electromagnetic dog clutch, comprising a movable gear sleeve and a fixed gear sleeve that mesh with each other for transmission, wherein a first end cap is provided on an outer side of the movable gear sleeve, a bearing is provided on an outer circumference of the movable gear sleeve, the bearing is embedded in the bearing seat, a rear end of the bearing seat is provided with a positioning surface, a front end of the first end cap is a vertical plane that matches the positioning surface of the bearing seat, and wherein the front end of the first end cap is provided with a positioning pin, the rear end of the bearing seat is provided with a positioning hole to cooperate with the positioning pin, and the positioning pin is inserted into the positioning hole to limit the bearing seat and the first end cap so that they can move in an axial direction relative to each other but cannot rotate relative to each other.

Optionally, there is a plurality of positioning pins that are arranged along a circumferential direction of the first end cap.

Optionally, a rear end of the positioning pin is threaded and fixed on the front end of the first end cap, and a front end of the positioning pin is provided with a straight slot, or a cross slot, or an inner hexagon slot for installing the positioning pin with an installation tool.

Optionally, a movable armature is sleeved on the outer side of the movable gear sleeve, and the movable armature can follow the movable gear sleeve to move along the axial direction, and the movable armature and the bearing seat are connected by a rivet.

Optionally, a radial flange is provided on an outer circumference of the bearing seat, and the flange is provided with a mounting hole corresponding to the rivet.

Optionally, a fixed armature is sleeved on the outer side of the fixed gear sleeve, a front end of the fixed armature is provided with a buffer member that acts as a buffer and leaves a gap between the fixed armature and the movable armature when the fixed armature and the movable armature attract each other, and the buffer member is fixed to the front end of the fixed armature by injection molding.

Optionally, the buffer member is a buffer pad arranged at the front end of the fixed armature, or multiple buffer blocks arranged at the front end of the fixed armature along the circumferential direction.

Optionally, the buffer pad or the buffer block is of an inverted T shape.

Optionally, an electromagnetic coil is arranged in the fixed armature, and when the electromagnetic coil is energized, the movable armature is attracted to the fixed armature, so that the movable gear sleeve and the fixed gear sleeve are meshed, and a height of the buffer member makes a gap between the movable armature and the fixed armature in a range of 0.1-1.5 mm after the movable armature and the fixed armature attract each other.

Optionally, the movable gear sleeve is sleeved on the first shaft via a spline, the movable gear sleeve can move along an axial direction of the first shaft, a front end of the first shaft is provided with an axial pressure plate, the axial pressure plate is connected to the movable gear sleeve via a spring, and when the electromagnetic coil is de-energized, the movable gear sleeve separates from the fixed gear sleeve due to an elastic force of the spring.

The advantages and beneficial effects of the electromagnetic dog clutch of the present utility model are as follows.

The positioning pin is added to the bearing seat of the movable gear sleeve. The other end of the positioning pin is installed on the end cap. The function of the positioning pin is circumferential positioning and to ensure that the bearing seat and the end cap do not rotate relative to each other, and only perform the axial reciprocating movement, thereby preventing the occurrence of friction between them.

The design of the bearing seat is optimized so that the bearing seat and the movable armature are connected together by rivet connection, which improves the anti-loosening performance and increases the reliability of the entire system.

The buffer pad or buffer block is fixed on the fixed armature by injection molding, which improves the production efficiency and at the same time increases the contact area between the buffer pad or buffer block and the movable armature.

Figure 1:
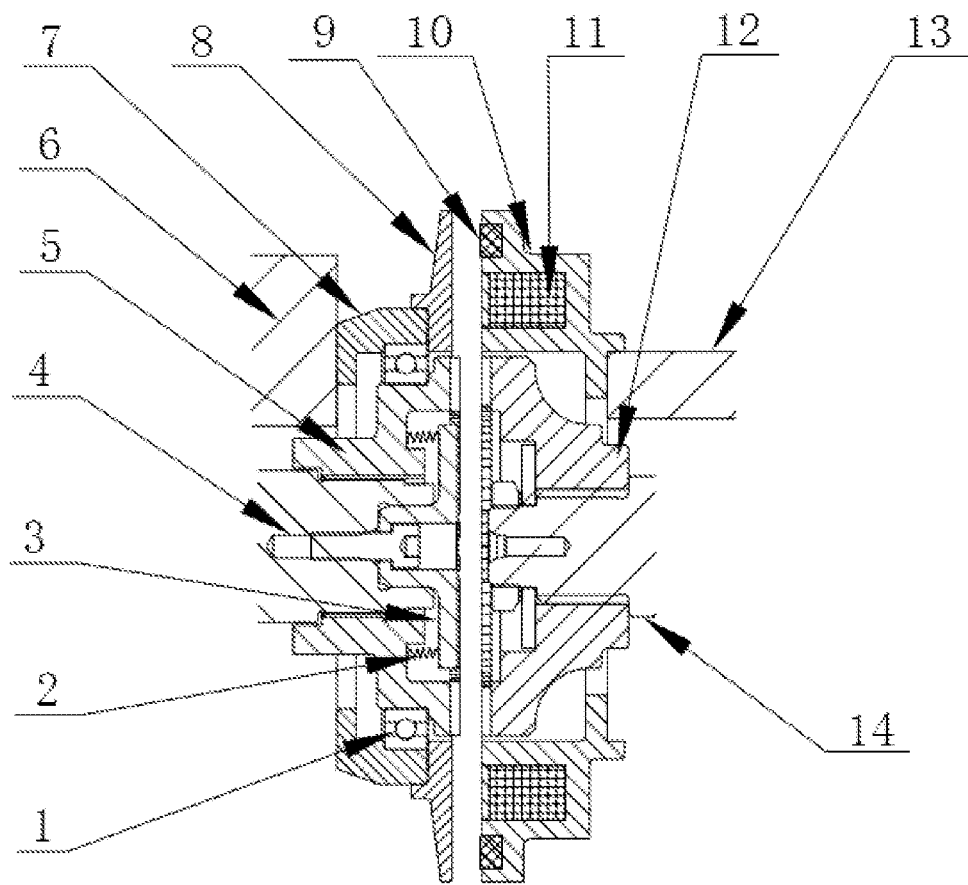
FIG. 1 is a schematic diagram of the structure of an electromagnetic dog clutch in the prior art.

In the drawings: 1: a bearing; 2: a spring; 3: an axial pressure plate; 4: a first shaft; 5: a movable gear sleeve; 501: a movable gear sleeve end gear; 6: a first end cap; 7: a bearing seat; 8: a movable armature; 9: a buffer pad; 10: a fixed armature; 11: an electromagnetic coil; 12: a fixed gear sleeve; 121: a fixed gear sleeve end gear; 13: a second end cap; 14: a second shaft; 15: a positioning pin; 16: a rivet.

DETAILED DESCRIPTION

The design concept of the present utility model is as follows.

With respect to the defect in the prior art that the friction is easy to occur between the bearing seat and the end cap of the movable gear sleeve and cause damage to the end cap, the present utility model provides an electromagnetic dog clutch, in which a positioning pin is added to the bearing seat of the movable gear sleeve. The other end of the positioning pin is installed on the end cap. The function of the positioning pin is circumferential positioning and to ensure that the bearing seat and the end cap do not rotate relative to each other, and only perform the axial reciprocating movement, thereby preventing the occurrence of friction between them.

In order to make the objectives, technical solutions, and advantages of the present utility model clearer, the embodiments of the present utility model will be described in further detail in conjunction with the accompanying drawings.

First Embodiment

FIGS. 2, 3, 4 and 5 show the first embodiment of the present utility model. In this embodiment, an electromagnetic dog clutch is provided, which comprises a movable gear sleeve 5 and a fixed gear sleeve 12 that mesh with each other for transmission. A first end cap 6 is provided on an outer side of the movable gear sleeve 5, a bearing 1 is provided on an outer circumference of the movable gear sleeve 5, the bearing 1 is embedded in the bearing seat 7, a rear end of the bearing seat 7 is provided with a positioning surface, a front end of the first end cap 6 is a vertical plane that matches the positioning surface of the bearing seat 7. The front end of the first end cap 6 is provided with a positioning pin 15, the rear end of the bearing seat 7 is provided with a positioning hole to cooperate with the positioning pin 15, and the positioning pin 15 is inserted into the positioning hole to limit the bearing seat 7 and the first end cap 6 so that they can move in an axial direction relative to each other but cannot rotate relative to each other, thereby preventing the occurrence of friction between them.

Since the torque transmitted by the movable gear sleeve 5 to the bearing seat 7 is very small, one positioning pin 15 is enough to limit the bearing seat 7 in the circumferential direction.

Of course, there may also be a plurality of positioning pins 15. When a plurality of positioning pins 15 are provided, the positioning pins 15 are arranged along the circumferential direction of the first end cap 6 and may be evenly distributed on the front end of the first end cap 6.

Figure 2:
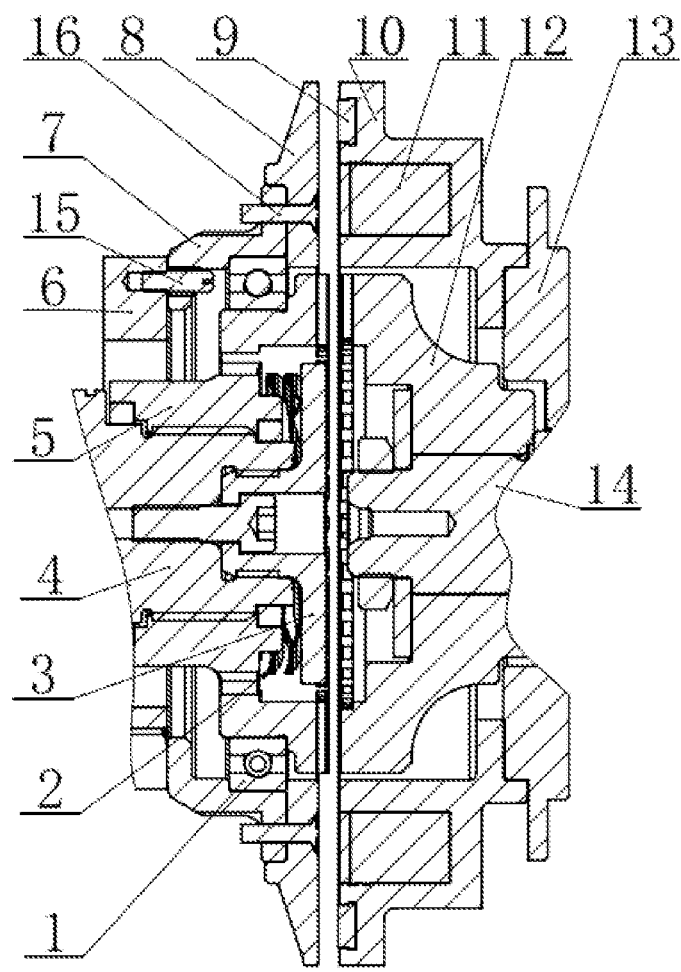
FIG. 2 is a schematic diagram of the structure of an electromagnetic dog clutch according to an embodiment of the present utility model.
Figure 3:
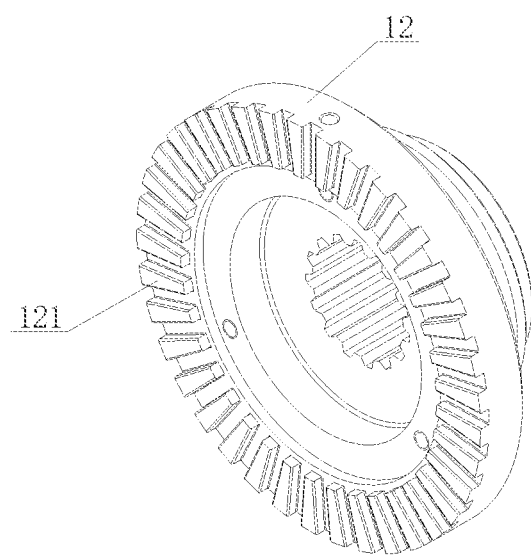
FIG. 3 is a schematic view of the structure of a fixed gear sleeve according to an embodiment of the present utility model.
Figure 4:
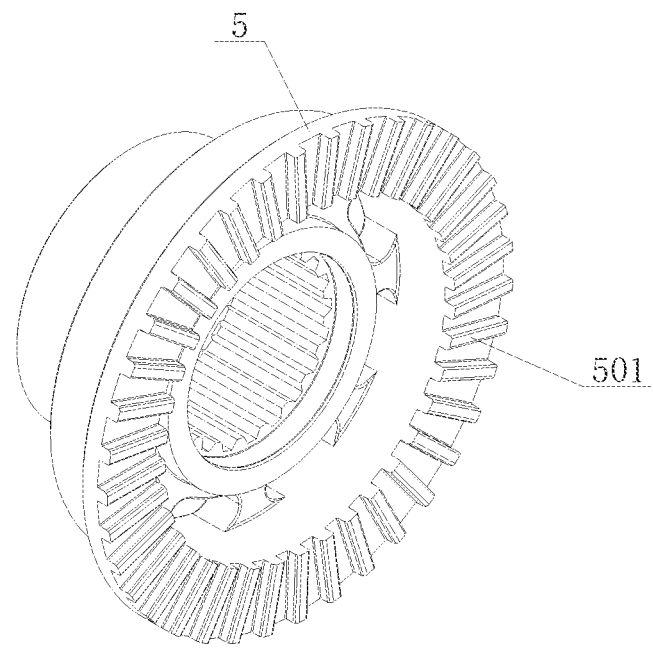
FIG. 4 is a schematic diagram of the structure of a movable gear sleeve according to an embodiment of the present utility model.

As shown in FIG. 2, the rear end of the positioning pin 15 is threaded and fixed on the front end of the first end cap 6, and the front end of the positioning pin 15 is provided with a straight slot, or a cross slot, or an inner hexagon slot for installing the positioning pin 15 with an installation tool.

The slot is provided to cooperate with the installation tool, so that the diameter of the positioning pin 15 is not increased, and the axial movement of the positioning pin 15 in the positioning hole of the bearing seat 7 is not hindered to facilitate the installation.

Figure 5:
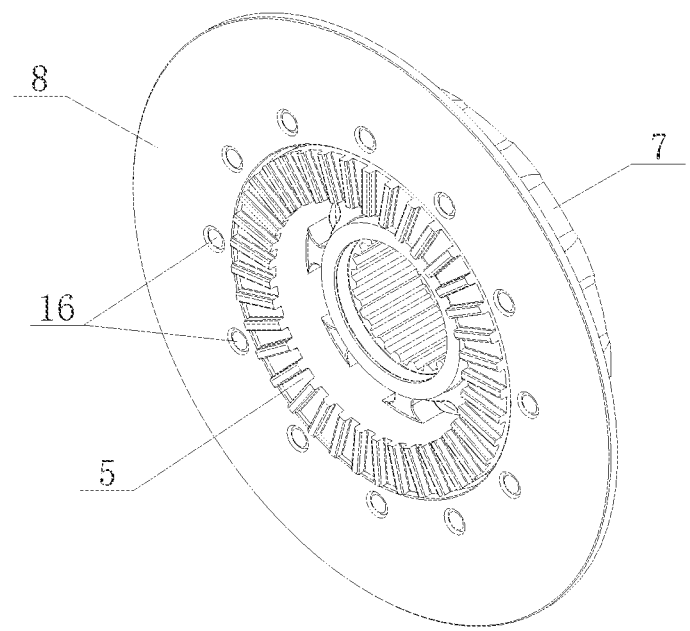
FIG. 5 is a schematic diagram of the assembly of a movable gear sleeve and a movable armature according to an embodiment of the present utility model.

A movable armature 8 is sleeved on the outer side of the movable gear sleeve 5, and the movable armature 8 can follow the movable gear sleeve 5 to move along the axial direction, and the movable armature 8 and the bearing seat 7 are connected by a rivet 16, as shown in FIGS. 2 and 5.

Compared with the bolt connection in the prior art, the rivet connection can improve the anti-loosening performance between the movable armature 8 and the bearing seat 7 and increase the reliability of the entire system.

In order to facilitate the installation of the rivet 16, as shown in FIG. 2, a radial flange is provided on the outer circumference of the bearing seat 7, and a mounting hole is provided on the flange corresponding to the rivet 16.

As shown in FIG. 2, a fixed armature 10 is sleeved on the outer side of the fixed gear sleeve 12, a front end of the fixed armature 10 is provided with a buffer member that acts as a buffer and leaves a gap between the fixed armature 10 and the movable armature 8 when the fixed armature 10 and the movable armature 8 attract each other, and the buffer member is fixed to the front end of the fixed armature 10 by injection molding.

On one hand, the buffer member avoids direct impact between the fixed armature 10 and the movable armature 8; on the other hand, when the fixed gear sleeve 12 meshes with the movable gear sleeve 5, a certain gap is ensured between the fixed armature 10 and the movable armature 8, so that after the fixed armature 10 and the movable armature 8 attract each other they will not be inseparable due to remanence.

In this embodiment, the buffer member is a buffer pad 9 provided at the front end of the fixed armature 10. The buffer pad 9 is fixed on the fixed armature 10 by injection molding. Compared with the bolt connection in the prior art, the production efficiency is improved, and the contact area between the buffer pad 9 and the movable armature 10 is increased.

Preferably, the buffer pad 9 is of an inverted T shape, so that the firmness of the buffer pad 9 on the fixed armature 10 can be improved.

As shown in FIG. 2, an electromagnetic coil 11 is arranged in the fixed armature 10, and when the electromagnetic coil 11 is energized, the movable armature 8 is attracted to the fixed armature 10, so that the movable gear sleeve 5 and the fixed gear sleeve 12 are meshed, and a height of the buffer member makes a gap between the movable armature 8 and the fixed armature 10 in a range of 0.1-1.5 mm after the movable armature 8 and the fixed armature 10 attract each other.

The movable gear sleeve 5 is sleeved on the first shaft 4 via a spline, the movable gear sleeve 5 can move along an axial direction of the first shaft 4, a front end of the first shaft 4 is provided with an axial pressure plate 3, the axial pressure plate 3 is connected to the movable gear sleeve 5 via a spring 2, and when the electromagnetic coil 11 is de-energized, the movable gear sleeve 5 separates from the fixed gear sleeve 12 due to an elastic force of the spring 2.

The function of the axial pressure plate 3 is to keep the spring 2 in a compressed state. With the disengagement and engagement of the clutch, the compression amount of the spring 2 will change, and the elastic force value will also change.

When the clutch is in the disengaged state, under the preload of the spring 2, the positioning surface of the bearing seat 7 is attached to the first end cap 6, thereby determining the position of the movable armature 8 in the disengaged state, so that after the movable armature 8 is separated from the fixed armature 10 the gap therebetween is in the range of 3.6-4 mm, which ensures that the fixed armature 10 has sufficient attraction force after the electromagnetic coil 11 is energized, and the movable armature 8 is quickly attracted. When the electromagnetic force generated by the electromagnetic coil 11 is greater than the elastic force of the spring 2 and the frictional force between the movable gear sleeve 5 and the first shaft 4, the clutch is changed from the disengaged state to the engaged state. In order to maintain the engaged state, the electromagnetic coil 11 needs to be energized and the generated electromagnetic force is greater than the elastic force at this moment. In the engaged state, the buffer pad 9 is attached to the movable armature 8 to ensure that the gap between the movable armature 8 and the fixed armature 10 is within the range of 0.3-0.5 mm. Through the accurate positioning between the movable armature and the end cap, the present utility model keeps the gap between the two armatures within a preset range after the clutch is separated, and thus ensures that the clutch has sufficient suction force when the clutch is engaged, and realizes rapid engagement.

When the clutch is engaged, the buffer pad 9 on the fixed armature 10 is closely attached to the movable armature 8, and there is no relative rotation between the movable armature 8 and the fixed armature 10, thereby avoiding the problem of mutual friction. At the same time, the fixed gear sleeve 12 and the movable gear sleeve 5 meshes with each other, rotate synchronously, and transmit torque. At this moment, only the side faces of the face teeth of the fixed gear sleeve 12 and the movable gear sleeve 5 are in contact, and their tooth roots and the tooth tops do not contact, and thus extra axial loads caused by an electromagnetic force will not be applied on the first shaft 4 and the second shaft 14, thereby reducing the loads on the bearings on the two shafts.

The electromagnetic dog clutch in this embodiment is applied to the electric drive system of new energy vehicles, it has a compact structure and has no auxiliary execution structure, and is convenient to operate. The system controls the transmission and disconnection of power torque. The present utility model has a simple structure and is convenient to assemble and manufacture.

Second Embodiment

This embodiment differs from the first embodiment in that a plurality of buffer blocks are arranged at the front end of the fixed armature 10 along the circumferential direction.

Preferably, the buffer block is also of an inverted T shape, so that the firmness of the buffer block on the fixed armature 10 can be improved.

Other structure of the electromagnetic dog clutch in this embodiment is the same as the first embodiment, so the description will not be repeated here.

The above description is only specific embodiments of the present disclosure, and the protection scope of the present utility model is not limited to them. Any person skilled in the art can easily think of changes or replacements within the technical scope disclosed by the present utility model, which shall fall within the protection scope of the present utility model. Therefore, the protection scope of the present invention should be subject to the protection scope of the claims.

What is claimed is:

1. An electromagnetic dog clutch, comprising a movable gear sleeve (5) and a fixed gear sleeve (12) that mesh with each other for transmission, a first end cap (6) is provided on an outer side of the movable gear sleeve (5), a bearing (1) is provided on an outer circumference of the movable gear sleeve (5), the bearing (1) is embedded in an bearing seat (7), a rear end of the bearing seat (7) is provided with a positioning surface, a front end of the first end cap (6) is a vertical plane that matches the positioning surface of the bearing seat (7), and wherein the front end of the first end cap (6) is provided with a positioning pin (15), the rear end of the bearing seat (7) is provided with a positioning hole to cooperate with the positioning pin (15), and the positioning pin (15) is inserted into the positioning hole to limit the bearing seat (7) and the first end cap (6) so that they can move in an axial direction relative to each other but cannot rotate relative to each other.

2. The electromagnetic dog clutch according to claim 1, wherein there is a plurality of positioning pins (15) that are arranged along a circumferential direction of the first end cap (6).

3. The electromagnetic dog clutch according to claim 1, wherein a rear end of the positioning pin (15) is threaded and fixed on the front end of the first end cap (6), and a front end of the positioning pin (15) is provided with a straight slot, or a cross slot, or an inner hexagon slot for installing the positioning pin (15) with an installation tool.

4. The electromagnetic dog clutch according to claim 1, wherein a movable armature (8) is sleeved on the outer side of the movable gear sleeve (5), and the movable armature (8) can follow the movable gear sleeve (5) to move along the axial direction, and the movable armature (8) and the bearing seat (7) are connected by a rivet (16).

5. The electromagnetic dog clutch according to claim 4, wherein a radial flange is provided on an outer circumference of the bearing seat (7), and the flange is provided with a mounting hole corresponding to the rivet (16).

6. The electromagnetic dog clutch according to claim 4, wherein a fixed armature (10) is sleeved on the outer side of the fixed gear sleeve (12), a front end of the fixed armature (10) is provided with a buffer member that acts as a buffer and leaves a gap between the fixed armature (10) and the movable armature (8) when the fixed armature (10) and the movable armature (8) attract each other, and the buffer member is fixed to the front end of the fixed armature (10) by injection molding.

7. The electromagnetic dog clutch according to claim 6, wherein the buffer member is a buffer pad (9) arranged at the front end of the fixed armature (10), or multiple buffer blocks arranged at the front end of the fixed armature (10) along the circumferential direction.

8. The electromagnetic dog clutch according to claim 7, wherein the buffer pad (9) or the buffer block is of an inverted T shape.

9. The electromagnetic dog clutch according to claim 6, wherein an electromagnetic coil (11) is arranged in the fixed armature (10), and when the electromagnetic coil (11) is energized, the movable armature (8) is attracted to the fixed armature (10), so that the movable gear sleeve (5) and the fixed gear sleeve (12) are meshed, and a height of the buffer member makes a gap between the movable armature (8) and the fixed armature (10) in a range of 0.1-1.5 mm after the movable armature (8) and the fixed armature (10) attract each other.

10. The electromagnetic dog clutch according to claim 9, wherein the movable gear sleeve (5) is sleeved on the first shaft (4) via a spline, the movable gear sleeve (5) can move along an axial direction of the first shaft (4), a front end of the first shaft (4) is provided with an axial pressure plate (3), the axial pressure plate (3) is connected to the movable gear sleeve (5) via a spring (2), and when the electromagnetic coil (11) is de-energized, the movable gear sleeve (5) separates from the fixed gear sleeve (12) due to an elastic force of the spring (2).

* * * * *